US008668202B2

(12) United States Patent
Phan

(10) Patent No.: US 8,668,202 B2
(45) Date of Patent: Mar. 11, 2014

(54) CASINO CARD GAME

(71) Applicant: Tu Thien Phan, Stanton, CA (US)

(72) Inventor: Tu Thien Phan, Stanton, CA (US)

( * ) Notice: Subject to any disclaimer, the term of this patent is extended or adjusted under 35 U.S.C. 154(b) by 0 days.

(21) Appl. No.: 13/669,881

(22) Filed: Nov. 6, 2012

(65) Prior Publication Data

US 2013/0234392 A1 Sep. 12, 2013

Related U.S. Application Data

(60) Provisional application No. 61/685,047, filed on Mar. 12, 2012.

(51) Int. Cl.
*A63F 1/00* (2006.01)
*A63F 13/00* (2006.01)

(52) U.S. Cl.
USPC .............................................. 273/292; 463/12

(58) Field of Classification Search
USPC ......... 273/292, 274, 309; 493/12, 13; 463/12, 463/13
See application file for complete search history.

(56) References Cited

U.S. PATENT DOCUMENTS

| | | | |
|---|---|---|---|
| 5,013,049 | A | 5/1991 | Tomaszewski |
| 5,072,946 | A | 12/1991 | Miller |
| 5,362,064 | A | 11/1994 | Lofink et al. |
| 5,397,128 | A | 3/1995 | Hesse |
| 5,407,209 | A | 4/1995 | Prerost |
| 5,415,414 | A | 5/1995 | Savage |
| 5,615,888 | A | 4/1997 | Lofink |
| 5,782,473 | A | 7/1998 | Chou |
| 5,823,536 | A | 10/1998 | Flasch |
| 5,911,418 | A | 6/1999 | Adams |
| 5,979,896 | A | 11/1999 | Lofink et al. |
| 6,070,875 | A | 6/2000 | Boylan |
| 6,164,651 | A | 12/2000 | Webb |
| 6,182,968 | B1 | 2/2001 | Wilkinson |
| 6,237,917 | B1 | 5/2001 | Timpano |
| 6,299,171 | B1 | 10/2001 | Mollo |

(Continued)

FOREIGN PATENT DOCUMENTS

| | | |
|---|---|---|
| WO | WO 00/44454 | 8/2000 |
| WO | WO 2008/151264 | 12/2008 |

OTHER PUBLICATIONS http://www.netbet.org/baccarat/rules.html.
http://mohawkcasino.com/?page_id=413.

(Continued)

*Primary Examiner* — Benjamin Layno
(74) *Attorney, Agent, or Firm* — CIONCA Law Group P.C.; Marin Cionca

(57) ABSTRACT

A method of playing a card game in which at least one player plays her own hand against a banker's hand, using at least one deck of conventional playing cards, wherein Kings, Queens, Jacks, and tens have a value of zero, Aces have a value of one, and all other cards have a value equal to their numeric face value, wherein, when the total value of the cards in a hand equals ten or more, only the right-hand digit is considered, and wherein the rank of the hands, from highest to lowest rank, starts with a Natural 9 hand, which is a two-card hand having a value of nine, followed by a three-card hand having a value of nine, and continues with an eight-through-zero hand, which is a two or three card hand that has a value of eight, seven, six, five, four, three, two, one or zero.

18 Claims, 10 Drawing Sheets

(56) References Cited

U.S. PATENT DOCUMENTS

| | | | |
|---|---|---|---|
| 6,345,823 | B1 | 2/2002 | Webb |
| 6,446,973 | B1 | 9/2002 | Pham |
| 6,592,125 | B1 | 7/2003 | Lizak |
| 6,688,598 | B1 | 2/2004 | Hsi |
| 6,871,856 | B1 | 3/2005 | Rozboril |
| 6,926,280 | B2 | 8/2005 | Abuan |
| 7,309,066 | B2 | 12/2007 | Donaldson |
| 7,575,236 | B1 | 8/2009 | Haber |
| 7,618,043 | B1 | 11/2009 | Hayden |
| 7,857,314 | B2 | 12/2010 | Scibetta |
| 8,262,449 | B2 | 9/2012 | Yoshizawa |
| 2003/0042679 | A1 | 3/2003 | Snow |
| 2003/0151201 | A1 | 8/2003 | Lee |
| 2004/0178581 | A1 | 9/2004 | Abuan |
| 2004/0256802 | A1 | 12/2004 | Centrone |
| 2008/0230995 | A1 * | 9/2008 | Snow ............................ 273/303 |
| 2010/0096808 | A1 | 4/2010 | Johnson |
| 2010/0317421 | A1 | 12/2010 | Kirkutis |
| 2012/0139182 | A1 | 6/2012 | Poon |
| 2012/0196665 | A1 | 8/2012 | Sparago |

OTHER PUBLICATIONS http://abuangaming.com/index-2.html.

* cited by examiner

CASINO CARD GAME

CROSS-REFERENCE TO RELATED APPLICATIONS

This application claims the benefit of U.S. Provisional Application No. 61/685,047, filed Mar. 12, 2012, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates to casino card games.

2. Description of the Related Art

Baccarat is one of the many live table games played in casinos or gaming establishments. Typically, Baccarat uses a standard deck of 52 playing cards and is usually dealt from a shoe having multiple decks that have been shuffled together prior to the beginning of the play.

The object of the game of Baccarat is for the bettor to successfully wager on whether the Bank's hand or the Player's hand is going to win. The bettor receives even money for his wager if he selects the winning hand and loses his wager if he selects the losing hand. Because of the rules of play of Baccarat and more particularly the pre-established draw rules, the Bank's hand has a slightly higher chance of winning than does the Player's hand. The winning frequency for the Bank's hand has been determined to be 0.45859 (45.859%) whereas the winning frequency for the Player hand is 0.44624 (44.624%) with the remainder of the outcomes being ties. Therefore, if the bettor wagers on the Bank's hand and the Bank hand wins, the bettor must usually pay to the gaming establishment a commission (typically, 5%) of the amount the bettor wins, in order to compensate for the Bank's edge. No commission is paid if the bettor successfully wagers on the Player's hand.

After the wagers have been placed, two cards each are dealt as the banker's hand and as a general player hand representing all players. Elaborate rules exist called “third card draw” rules, or simply draw rules, wherein the banker's hand, the player hand, or both, are required to draw a third card based on the values of the two-card hands.

Typically, the baccarat third card draw rules are mandatory, and are as follows. If the initial two-card player hand has a point total of 0, 1, 2, 3, 4 or 5, the player hand must draw a third card. If the initial two-card player hand has a point total of 6-9, the player hand stands and does not receive a third card.

If the player hand stands and does not draw a third card, then the bank hand follows the draw rule above.

If the player hand draws a third card, then the bank hand must draw or stand as follows. If the bank hand two-card point total is 0-2, the bank must always draw. If the bank hand two card point total is 3, then the bank hand must draw when the player hand's third card is 0-7 or 9, and the bank must stand if the player hand third card is 8. If the bank hand two card point total is 4, then the bank hand must draw when the player hand's third card is 2-7, and the bank must stand if the player hand's third card is 0, 1, 8 or 9. If the bank hand two card point total is 5, then the bank hand must draw when the player hand's third card is 4-7, and the bank must stand if the player hand's third card is 0-3, 8 or 9. If the bank hand two card point total is 6, then the bank hand must draw when the player hand's third card is 6 or 7, and the bank must stand if the player hand's third card is 0-5, 8 or 9. If the bank hand two card point total is 7-9, then the bank always stands.

As can be imagined from the above rules, baccarat may be intimidating to inexperienced players. Furthermore, the game is time consuming as following these complicated rules and calculating the commissions take a long time and interrupt the flow of the game, thus, preventing the casino from reaching the game's full profit potential and annoying the casino patrons. In addition to being complicated and time consuming, the baccarat game, as known, offers limited options and variations to the players and the casino on how to play the game.

Thus, there is a need for a new casino card game using simplified rules such that more rounds can be played in a given amount of time and offering additional and more attractive playing variations and betting options to the patrons of the casino so that they get more excited about the game, feel more in control, and as a consequence and in the same time, the casino increases its profits.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment each player of a card game is offered five wager options, having different degrees of risk and reward, and, after the wager/bet is placed, she is dealt two cards, and a third card under certain conditions, the winning hand having a total of nine points or the closest to nine. Thus, an advantage is that, by playing with her own cards, each player feel more in control of the game. Another advantage is that each player can choose the betting/wagering option she is comfortable with, thus, making the game attractive to a larger pool of players.

In another exemplary embodiment each player is offered the option of surrendering her hand in exchange of losing only partially the wagered amount. Thus an advantage is that the players may choose to cut their losses, making the card game more attractive.

In another exemplary embodiment, five betting options are combined with a community player such that the community player, not the individual players, receives cards. Thus, an advantage is that while the game is attractive (more betting options), it is also simple and convenient to play.

The above embodiments and advantages, as well as other embodiments and advantages, will become apparent from the ensuing description and accompanying drawings.

The object of the invention is to provide a card game which is suitable for use in a gaming establishment and other environment that will: be quick to play; require simple math to determine the necessary odds to make game decisions; enable each player to play against a banker; be played on a common gaming table that does not require significant apparatus; give optional bonuses for players to wager to make the game a more attractive, fun and exciting experience for the players, while still maintaining game odds suitable for the game establishment.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1A:
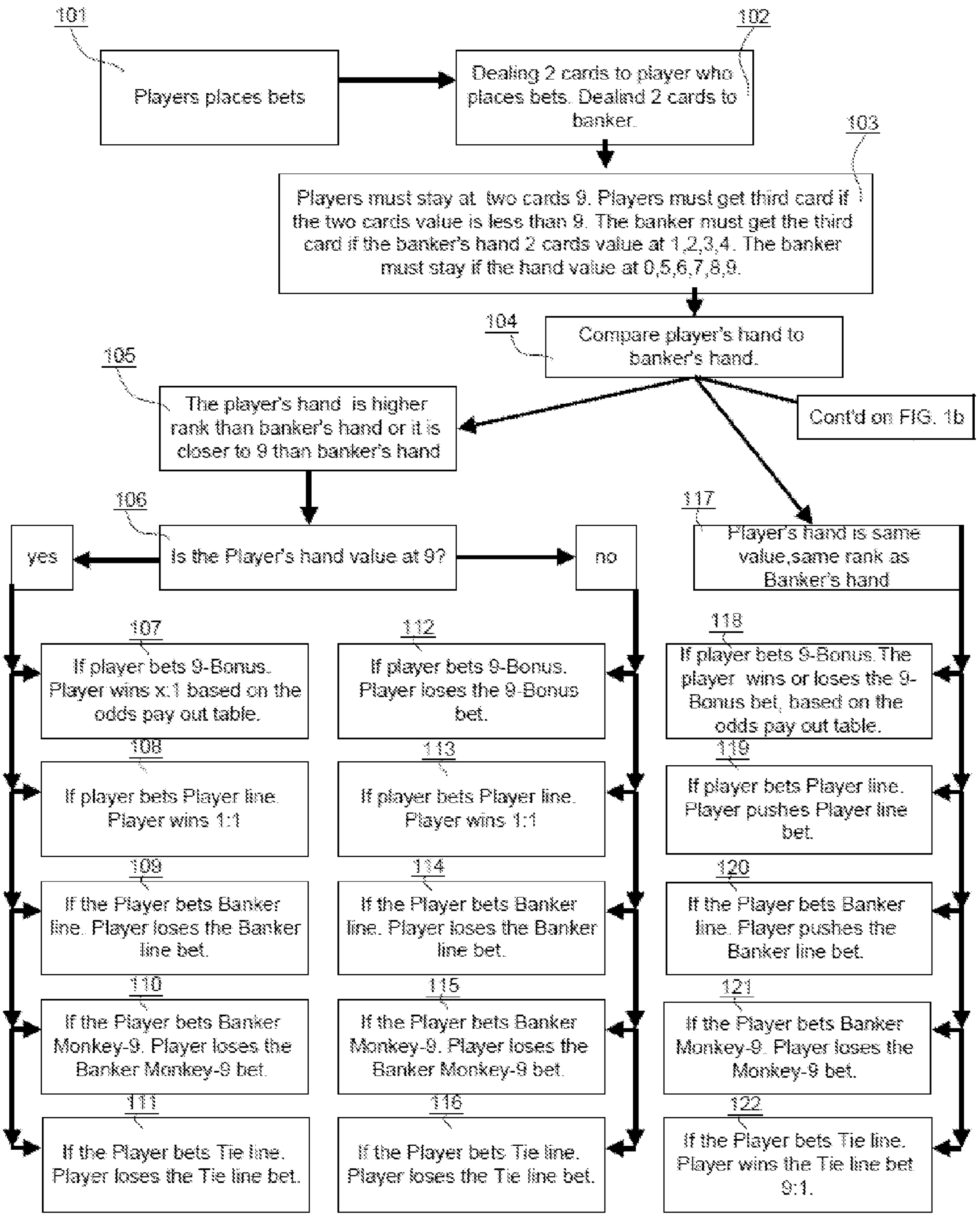
FIGS. 1*a-b* is an illustrative flowchart of a method of playing a casino card game according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

The object of the casino game disclosed herein is preferably to assemble two or more hands of two or three cards with an accumulated point value as close to nine as possible. The game is preferably played using a standard 52-card deck and no jokers. Cards may be dealt using a multiple deck shoe or shuffle machine. A minimum of four decks and a maximum of eight decks should preferably be used during the play of the game.

The value of each card used in the game, shall be as follows: picture cards (king, queen, jack) and the 10's have a value of zero, an ace has a value of one, and all other cards have their face value. When the total numerical value of the cards equals ten or more, only the right-hand digit (numeric count) is considered.

The ranking of the hands for the game, from highest to lowest rank, shall be as follows: a "natural 9," which is a two card hand that has a value of nine, and which shall only be achieved when the first two cards dealt to a hand is valued at nine, according to the rules above; a three-card hand having the value of nine; and, an eight-through-zero hand, which is a two or three card hand that has a value of eight, seven, six, five, four, three, two, one or zero.

The game may be played on either a standard blackjack table that accommodates up to seven players and a player-dealer position for a total of eight seated positions (see FIGS. 2, 4, 6) or a standard baccarat table that accommodates up to thirteen players and a player-dealer position for a total of fourteen seated positions. Within each betting area for each seated player, there should preferably be, as it will explained in more details herein, up to five separate betting spaces specifically designated for separate wagers. The up to five betting spaces may be selected from the following list of six options: the player line, the banker line, the 9-bonus, the tie bet, the player's monkey-9 and banker's monkey-9 bonuses bet. Each betting space/area at the table may have a fixed amount for wagering limits defining the minimum and maximum amounts that may be wagered. Players will typically be required to bet at least the table minimum. Back-line betting is not typically permitted for any bet; however, a gaming establishment (e.g., a casino) may choose to allow back-line betting for one or more bets.

Dealing Procedures and Round of Play

At the start of a game a player may be offered the player-dealer (also called player-banker) position to bank the game. This may be a necessity in jurisdictions such as California where the gaming establishment is not permitted to bank the game. Once this is accomplished, the house dealer, who is typically a casino employee, typically waits for each player to make their wager (see for example FIG. 1*a*, step 101) in accordance with the game table limits.

Each player may have the following options when placing their wager(s), as it will be explained in more details later herein when referring to each of the three methods/variations of playing the game:

The player line (202 in FIG. 2) which may pay 1 to 1;

The banker line (203 in FIG. 2) which may pay 1 to 1;

The tie bet line (204 in FIG. 2), which may pay 9 to 1;

The "9-bonus" bet (206 in FIG. 2), which may pay based on a payout table chosen by the casino as explained later herein.

If a player placed a wager on either the player line or the banker line or both, that player may also place a wager on one or both of the "Monkey-9" bonus bets, which are named and may pay as follows: the Player's Monkey-9 bonus bet (see 604 in FIG. 6) which may pay 40-42 to 1 and the banker's Monkey-9 bonus bet (205 in FIG. 2) which may pay 30-40 to 1, as it will explained in more details later herein.

Once all wagers are placed (e.g., step 101 in FIG. 1*a*), if the game is played in a version having multiple individual player hands (see FIGS. 1*a-b*), the house dealer deals one card to each player, one by one in rotation until each player has a total of two cards each, and then two cards to banker (step 102). If a player betted in a player line: she uses the cards dealt to her to compare with the banker's hand (step 104). If she betted in a banker line, she uses the banker's hand to compare with her own hand to determine wins or loses. Preferably, the player's hand is resolved first and then the banker's hand is next resolved. As a general rule, the hand that is closest to nine wins, as it will be explained in more details herein.

Figure 2:
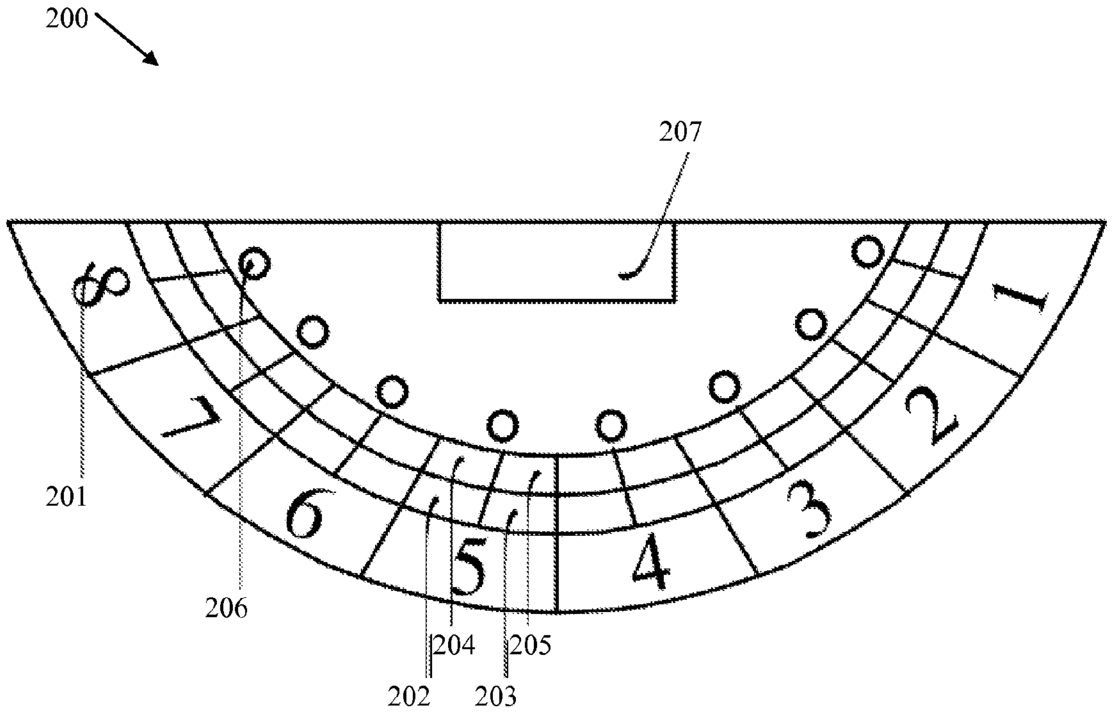
FIG. 2 shows an illustrative representation of a casino card game table arranged for playing the game according to the method from FIGS. 1*a-b*.

After the house dealer delivers the first two cards to both the player(s) and banker (step 102 FIG. 1*a*), these player draw rules are followed (step 103): a player must draw a third card when her hand is valued at 0 through 8, regardless of the banker's hand value; a player must stand (i.e., no third card is drawn) on two cards totaling nine points (i.e., natural 9); if the player's hand is a natural 9 and the banker's hand is not, the dealer-banker (e.g., a player-dealer) should pay the player wager immediately if the player betted on the player line/area (202 in FIG. 2) or the dealer should collect the wager immediately if the player betted on the banker (i.e., placed the bet on area 203 in FIG. 2).

After all the players have acted for a complete hand following the above player draw rules for the players, then the banker's hand may need to draw a third card using the following banker draw rules: the banker's hand must draw a third card when the hand is valued at 1 through 4, regardless of the players' hand value, and must stand when the hand is valued at 0, 5, 6, 7, 8 or 9 regardless of the players' hand value.

How Each Wager Wins, Loses, or Pushes

Once both hands have been completed, according to the guidelines above, the player's wagers are settled and the dealer-banker/player-dealer shall pay and collect all wagers accordingly, as follows: the player-dealer shall pay all winning player line wagers made by players when the individual player's hand is closer to nine than the banker's hand; the player-dealer shall pay all winning banker line wagers made by players when the banker's hand is closer to nine than the individual player's hand; the player-dealer shall collect all losing player line wagers made by players when the banker hand is closer to nine than the individual player's hand; and, the player-dealer shall collect all losing banker line wagers made by players when the individual player's hand is closer to nine than the banker's hand.

What follows is a description of the tie bet. For each seated position (e.g., 8 in total as shown in FIG. 2), there shall be one separate and specifically designated area (e.g., 204 in FIG. 2), for the placement of a tie bet wager. A player may typically place a tie bet wager even if she has not also placed either a player line wager (202 in FIG. 2) or a banker line wager (203 in FIG. 2). The player-dealer shall pay all winning tie bet wagers when the total of points in the player's hand and the total of points in the banker's hand are equal, with the exception(s) noted below. Thus, the tie bet may be won when player has two cards valued at 9 and banker has two cards valued at 9, when three cards valued at 9 tie three cards valued at 9 and when any other tie occurs, regardless of the number of cards (e.g., when banker has two cards valued at 5 and player has three cards valued at 5 is a tie, when banker has three cards valued at 6 and player has three cards valued at 6 is a tie, and so on). Hence, an exception is when one party has three cards valued at 9 and the other party has two cards valued at 9. Then, although the point value is the same (i.e., 9 points), the three-card hand loses to the two card hand (thus, no tie), because the two card hand has superior rank (i.e., the natural 9). As mentioned earlier, the payout may be 9:1, and in this case the profit would be about 8%. Other payout variations may be chosen, based on such factors as the profit desired and the attractiveness of the game to the players. For example, a payout ratio of 8:1 may be chosen for a profit of approximately 15%. It should be understood that the 8:1 option would be more attractive to the entity banking the game and less attractive to the players. The player-dealer shall collect all losing tie bet wagers when the total of the player's hand and the total of the banker's hand are not equal, regardless the number of cards. Again, as mentioned earlier, back-line betting is not typically permitted on any bet, including the tie bet.

It should be understood that, as a general rule, the tie bet takes into account the total value of the player's hand and the total value of the banker's hand, regardless the number of cards each hand has, at the completion of the round following the draw rules described earlier. There is usually one exception, when one hand (e.g. player's hand) has two cards valued at nine and the other hand (e.g., banker's hand) has three cards valued at nine. In this case, although the total value is the same, nine, there is no tie because the two cards hand has superior rank. Thus, each hand must be played according to the guidelines and draw rules described above, and in the event that the player's hand and the banker's hand are of the same value and rank, the tie bet wager shall win. In the event that the player's hand and the banker's hand are not of the same value and rank, the player-dealer shall win the tie bet wager.

What follows is a description of the Monkey-9 bets mentioned earlier (i.e., Player's Monkey-9 bet and Banker's Monkey-9 bet). For each seated position, there shall be two separate and specifically designated areas for the placement of two Monkey-9 (bonus) bets/wagers. Again, a player may only place Monkey-9 bonus bets/wagers if they have also placed a wager on either the player line, the banker line or both, prior to the initial dealing of cards, and back-line betting is not typically permitted on any of the bets, including the Monkey-9 bonus bets.

If the player's hand has a point value of nine using three cards and the banker's final hand has a value of 1, 2, 3, 4 or 5, regardless of the number of cards, the Player's Monkey-9 bonus bet will win. The Player's Monkey-9 bonus bet will lose on all other outcomes.

As stated earlier, the Player's Monkey-9 bonus winning bets may preferably be paid 40-42 (i.e., 40 or 41 or 42, or any number between 40 and 42) to 1 (e.g., 40.4:1, 42:1) and the player line may be paid 1:1 as mentioned earlier. For example, at 42:1, the profit would be approximately 1.5% while at 40:1 the profit would be about 8%. It should be noted that, as it is the case with all other bets, a low payout ratio, while translating in more profit ratio for the entity banking the game, it also means that the bet, and thus the game, is less attractive to players. That a balance has to be reached that proves to be the most lucrative for a particular gaming establishment (including less than 40:1 or more than 42:1). It should be understood that working with even and/or whole numbers, such as 40:1 makes it easier to calculate the payouts. Thus, working with such numbers may be an additional criterion for choosing one payout ratio or another.

The Banker's Monkey-9 bonus bet is typically won when banker's hand has three cards valued at nine points and the player's hand has a value of eight or less using three cards. The Banker's Monkey-9 bonus bet win may preferably be paid 30-40 to 1 (e.g., 30:1, 32.5:1, 39:1 and so on) and the banker line, if betted on by the winning player, will typically be a push (i.e., player's bet is returned). In selecting one payout ratio or another (including less than 30:1 or more than 40:1), the same exemplary factors and criteria described above when referring to the player Monkey-9 bet may be considered. Furthermore, a particular payout ratio may be associated with a certain win rule. For example, a payout of 40:1 or a payout of 30:1 (or both) may be offered according to the following rules: if the banker's first two cards point value is 1, 2 or 3 and the third card point value is 8, 7 or 6, respectively (i.e., 9 points total in each case), the payout ratio is 40:1; if the banker's first two cards point value is 4 and the third card point value is 5 (i.e., 9 total), the payout ratio is 30:1. The simultaneous use of the 40:1 and 30:1 rules described above would mean an approximately 6% profit ratio.

As another example, a 39:1 payout ratio may be offered (i.e., about 2.4% in profit) in association with the following rule: if the banker's hand has a point value of nine using three cards and the player's hand has a value of eight or less using three cards, the Banker's Monkey-9 bonus bet will win (the Banker's Monkey-9 bonus bet will lose on all other outcomes).

What follows is a description of the 9-bonus bet mentioned earlier. Preferably, the 9-Bonus wager operates independently of all other game wagers and of the value of the banker's hand. When the house/casino dealer needs to determine if a 9-bonus bet wins or loses the casino dealer will use one of the previously selected 9-bonus bet payout tables below, and the player's two or three cards hand.

TABLE NO. 1

The 9-bonus payout exemplary option no. 1

| WINNING HANDS | PAYOUT |
|---|---|
| 3-3-3 Three cards have the same value of three. | Pays 200:1 |
| 2-3-4 The hand contains a two, a three and a four. | Pays 42:1 |
| 0-0-9 The hand contains two zeros and a nine such as: K-K-9, K-T-9, Q-J-9, and so on. | Pays 36:1 |
| The three card hand is valued at 9 and there is a pair: 1-1-7, 2-2-5, 4-4-1, 5-5-9, 6-6-7, 7-7-5, 8-8-3, 9-9-1 | Pays 30:1 |
| Any three card hand that is valued at 9 and it is not in the above categories, such as: 1-2-6, 1-3-5, and so on. | Pays 3:1 |
| ALL OTHER HANDS WILL LOSE. | |
| Profit realized using this table would be approximately 3%. | |

TABLE NO. 2

The 9-bonus payout exemplary option no. 2

| WINNING HANDS | PAYOUT |
|---|---|
| 3-3-3 Three cards have the same value of three. | Pays 200:1 |
| 2-3-4 The hand contains a two, a three and a four. | Pays 40:1 |
| 0-0-9 The hand contains two zeros and a nine such as: K-K-9, K-T-9, Q-J-9, and so on. | Pays 30:1 |
| The three card hand is valued at 9 and there is a pair: 1-1-7, 2-2-5, 4-4-1, 5-5-9, 6-6-7, 7-7-5, 8-8-3, 9-9-1 | Pays 24:1 |
| Any three card hand that is valued at 9 and it is not in the above categories, such as: 1-2-6, 1-3-5, and so on. | Pays 3:1 |
| Any two cards valued at 9 (nine). | Pays 0 but is a push. |
| ALL OTHER HANDS WILL LOSE. | |
| Profit realized using this table would be approximately 3.3%. | |

TABLE NO. 3

The 9-bonus payout exemplary option no. 3

| WINNING HANDS | PAYOUT |
|---|---|
| 3-3-3 Three cards have the same value of three. | Pays 200:1 |
| 2-3-4 The hand contains a two, a three and a four. | Pays 40:1 |
| 0-0-9 The hand contains two zeros and a nine such as: K-K-9, K-T-9, Q-J-9, and so on. | Pays 30:1 |
| The three card hand is valued at 9 and there is a pair: 1-1-7, 2-2-5, 4-4-1, 5-5-9, 6-6-7, 7-7-5, 8-8-3, 9-9-1 | Pays 6:1 |
| Any three card hand that is valued at 9 and it is not in the above categories, such as: 1-2-6, 1-3-5, and so on. | Pays 3:1 |
| Any two cards valued at 9 (nine). | Pays 2:1 |
| ALL OTHER HANDS WILL LOSE. | |
| Profit realized using this table would be approximately 3.0%. | |

TABLE NO. 4

The 9-bonus payout exemplary option no. 4

| WINNING HANDS | PAYOUT |
|---|---|
| 3-3-3 Three cards have the same value of three. | Pays 200:1 |
| 2-3-4 The hand contains a two, a three and a four. | Pays 40:1 |
| 0-0-9 The hand contains two zeros and a nine such as: K-K-9, K-T-9, Q-J-9, and so on. | Pays 25:1 |
| The three card hand is valued at 9 and there is a pair: 1-1-7, 2-2-5, 4-4-1, 5-5-9, 6-6-7, 7-7-5, 8-8-3, 9-9-1 | Pays 7:1 |
| Any three card hand that is valued at 9 and it is not in the above categories, such as: 1-2-6, 1-3-5, and so on. | Pays 3:1 |
| Any two cards valued at 9 (nine). | Pays 2:1 |
| ALL OTHER HANDS WILL LOSE. | |
| Profit realized using this table would be approximately 6.0%. | |

It should be noted that if the casino selects Table No. 1, when the player's two cards have a total point value of nine, unlike when using for example Table No. 3, the player loses the 9-bonus bet.

It should be understood that the above tables are given for exemplification purposes only. Thus, one of ordinary skills in the art would realize that additional variations may be configured, without departing from the scope of the invention. Furthermore, it should be understood that a particular table may be selected based on, for example, the profit ratio desired.

For ten million (10,000,000) hands played, the odds for the above payout tables are as follows (TABLE NO. 5):

| | Approximate number of occurrences | | Frequency (approximately every) | |
|---|---|---|---|---|
| 3-3-3 | 3802 | hands | 2630 | hands |
| 2-3-4 | 27737 | hands | 361 | hands |
| 0-0-9 | 72865 | hands | 137 | hands |
| 9-pair | 103887 | hands | 96 | hands |
| any other 9 | 490379 | hands | 20 | hands |
| 2 cards 9 | 951172 | hands | 11 | hands |

Figure 1B:
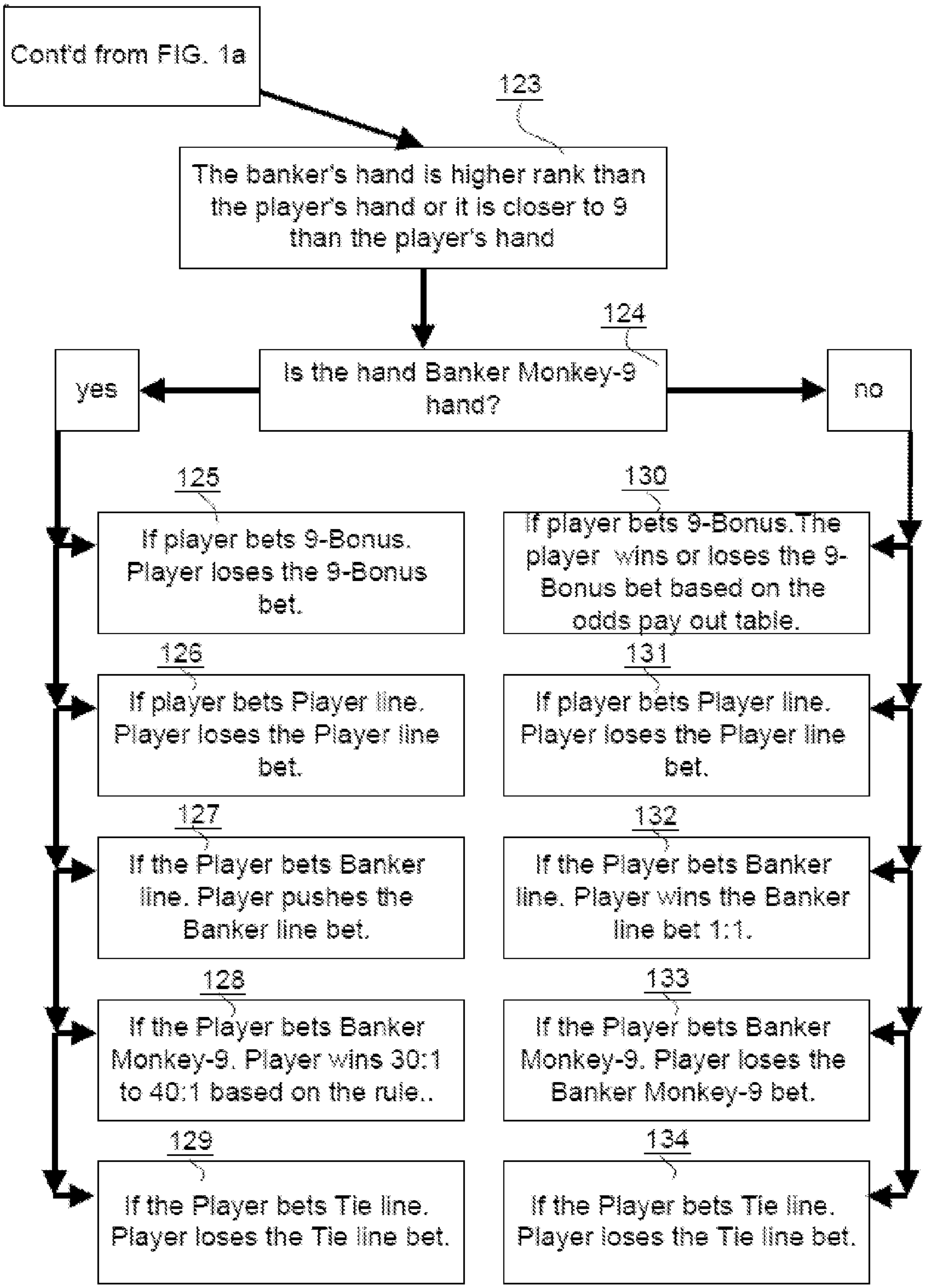

FIGS. 1*a-b* is an illustrative flowchart of an exemplary method of playing a casino card game according to an embodiment. According to this method, the game is played using multiple individual player hands as it will be explained hereinafter. As shown in step 101, the game typically starts by players placing the bets in one or more of the following betting areas depicted in FIG. 2: the player line betting/wagering area 202, the banker line betting area 203, the tie line betting area 204, the banker "Monkey-9" betting area 205 and the 9-bonus betting area 206.

It should be noted in FIG. 2 that the game table 200 associated with this exemplary method of playing the game is arranged such that each of the player sections 201 (see section 1-8 in FIG. 2), typically eight in total, one for the player-dealer if one is required in the respective jurisdiction as described earlier, and seven for the players, has its own five betting areas 202-206 mentioned above. Furthermore, the game table 200, as shown, will typically include a dealer tray 207.

Next, in step 102, the house dealer deals one card to each player who placed bets, preferably one by one, in rotation, until each player has a total of two cards each. Two cards are also dealt to banker. It should be noted that the cards may be dealt to each player and to banker face up or face down. After the cards are dealt to players and banker, the simplified pre-established draw rules described earlier and shown again in step 103 are followed. Again, the players who's two cards value totals 9, will stay/stand (i.e., no third card will be drawn). In contrast, players who's two cards value is less than 9 (i.e., 0-8), are required to draw a third card. Thus, it should be noted that unless a player has the natural 9 hand (i.e., two cards valued at a total of 9 points), that player will have to draw a third card, and thus, will have a three-card hand. The banker will stand if the two cards total value is 0, 5, 6, 7, 8 or 9, and will be required to draw a third card if the value is 1, 2, 3 or 4.

Next, in step 104, each player compares her card hand with the banker's hand. Typically, the player's hand is resolved first and then the banker's hand is resolved. As earlier described, as a general rule, the hand that is closest to nine will win. However, several outcomes are possible for each player according to the pre-established betting/payout rules described earlier for each bet/wager and as briefly depicted in steps 105-134 (FIGS. 1*a-b*). Thus, as shown, if a player's hand value is 9 (nine) and the banker's hand is less than 9 (steps 105-106), and let's say for simplicity purposes that the player betted in step 101 on all five betting areas 202-206 (FIG. 2) according to the betting rules earlier described, then that player may get a payout for the 9-bonus bet (step 107) according to, for example, the win rules of one of the payout tables earlier described, may get a payout of typically 1:1 on the player lien bet (step 108), and she will lose the banker line bet/wager (step 109), the banker Monkey-9 bet (step 110) and the tie line bet (step 111).

If both, the player's hand value and the banker's hand value is less than 9, but the player's hand is closer to nine (9) than the banker's hand, and again, let's say for simplicity purposes that the player betted in step 101 on all five betting areas 202-206 (FIG. 2) according to the betting rules earlier described, then that player will lose the 9-bonus bet (step 112), may get a payout of typically 1:1 on the player line bet (step 113), and she will also lose the banker line bet/wager (step 114), the banker Monkey-9 bet (step 115) and the tie line bet (step 116). If the player's hand and the banker's hand have same value (step 117) and same rank, and again, let's say for simplicity purposes that the player betted in step 101 on all five betting areas 202-206 (FIG. 2) according to the betting rules earlier described, then the player wins or loses the 9-Bonus bet based on the odds pay out table (step 118), may be allowed to push the player line bet (step 119) and the banker line bet (step 120), she will lose the banker Monkey-9 bet (step 121) and she will win the tie line bet (step 122) receiving typically, as described earlier herein, a payout of 9:1 or the like.

If a banker's hand is higher in rank or its value is closer to 9 (nine) than the player's hand (step 123) and banker's hand is also a banker Monkey-9 hand (steps 124), according to, for example, the win rules earlier described, and let's say for simplicity purposes that the player betted in step 101 on all five betting areas 202-206 (FIG. 2) according to the betting rules earlier described, then that player will normally lose the 9-bonus bet (step 125) and the player line bet (step 126), she may be allowed to push the banker line bet/wager (step 127), she will win the banker Monkey-9 bet (step 128) typically at a payout rate of 30:1 to 40:1, according to the win rules earlier described, and she will normally also lose the tie line bet (step 129).

If a banker's hand is higher in rank or its value is closer to 9 (nine) than the player's hand (step 123) and banker's hand is not also a banker Monkey-9 hand (step 124) according to, for example, the win rules earlier described, and let's say for simplicity purposes that the player betted in step 101 on all five betting areas 202-206 (FIG. 2) according to the betting rules earlier described, then the player wins or loses the 9-Bonus bet based on the odds pay out table (step 130), loses the player line bet (step 131), she will win the banker line bet (step 132) typically at a 1:1 payout rate as earlier described, she will normally lose the banker Monkey-9 bet (step 133) and she will normally also lose the tie line bet (step 134).

Figure 3A:
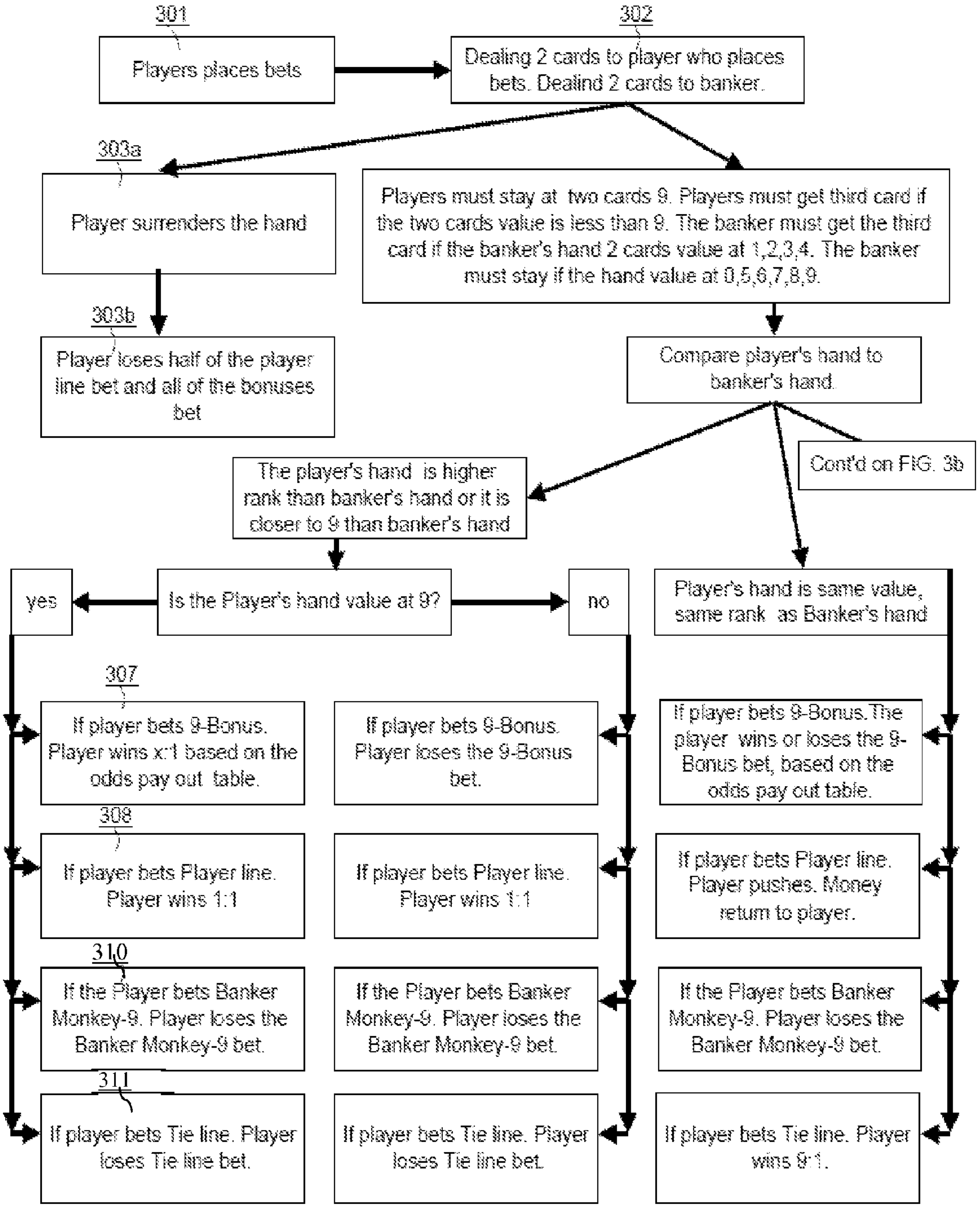
FIGS. 3*a-b* is an illustrative flowchart of another method of playing a casino card game according to an embodiment.
Figure 3B:
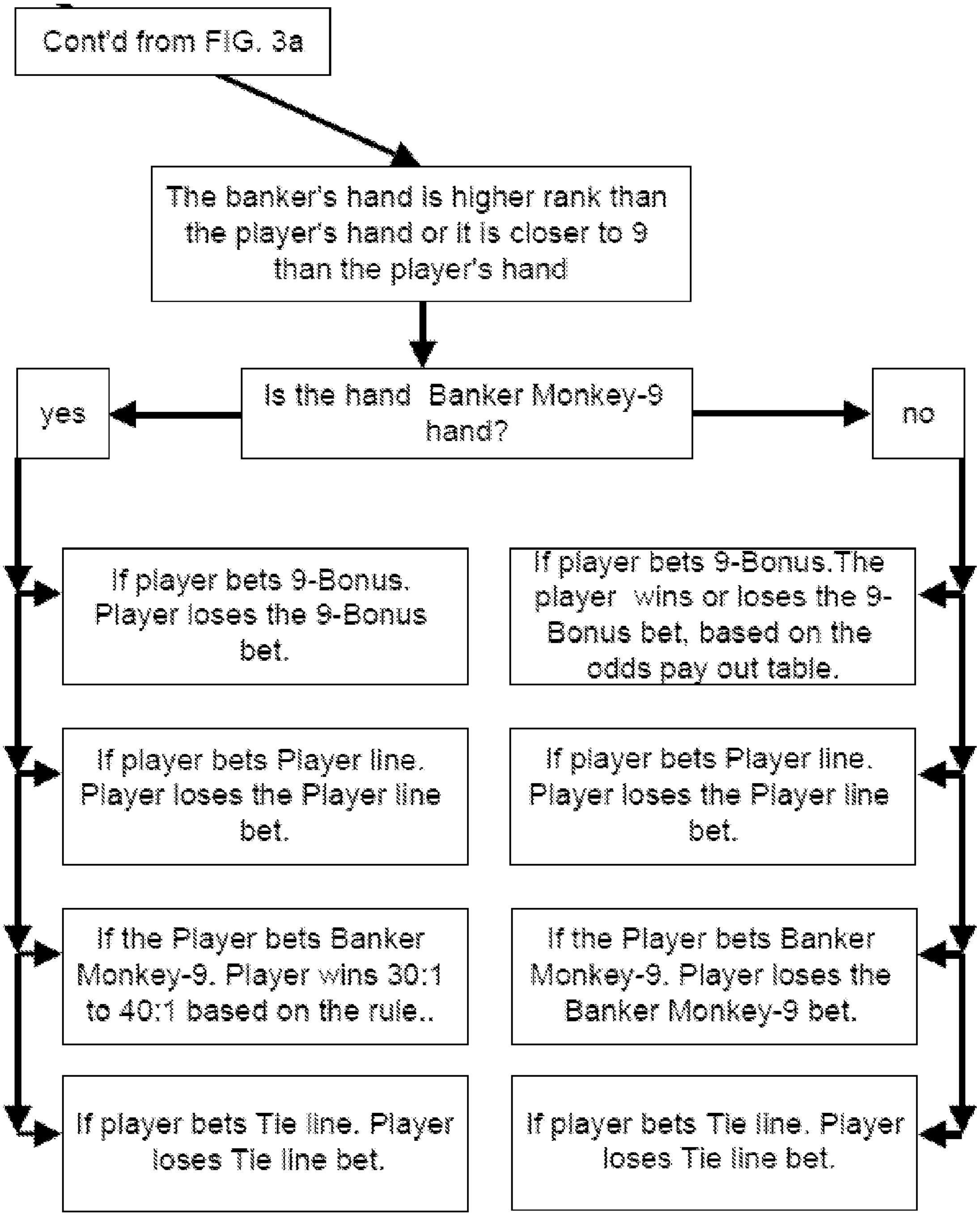

FIGS. 3*a-b* is an illustrative flowchart of another method of playing a casino card game according to another embodiment. It should be noted that there two major differences between the method described above in reference to FIGS. 1*a-b* and this alternative method. First, it should be noted that after the players place their bets (step 301) and first two cards are dealt to players (cards face up or down) and banker (one of the two cards face down), step 302, unlike in the FIGS. 1*a-b* method, the players have the option to surrender their two-card hand of cards (step 303*a*). If they do so, they will lose (step 303*b*) half of the player line bet and all of the bonuses bet available for this method of play (i.e., 9-bonus bet and banker Monkey-9 bet). It should be noted that if the player two-card hand is less than 9 and the player does not surrender, player must draw a third card to complete the hand and continue the game. Thus, no surrender is allowed after the third card is drawn. The second difference is that, in order to compensate for the surrender option, and still keep the game attractively profitable for the banking entity, only four bets (not five) are available to the players. They are the 9-bonus bet (step 307), the player line bet (step 308), the banker Monkey-9 bet (step 310) and the tie line bet (step 311). All the other details in terms of steps and the applicable rules (i.e., draw rules, win rules, payout rules, etc) are substantially the same as stated above in reference to the FIGS. 1*a-b* method and as illustrated in the flow charts of FIG. 3*a* and FIG. 3*b*.

Figure 4:
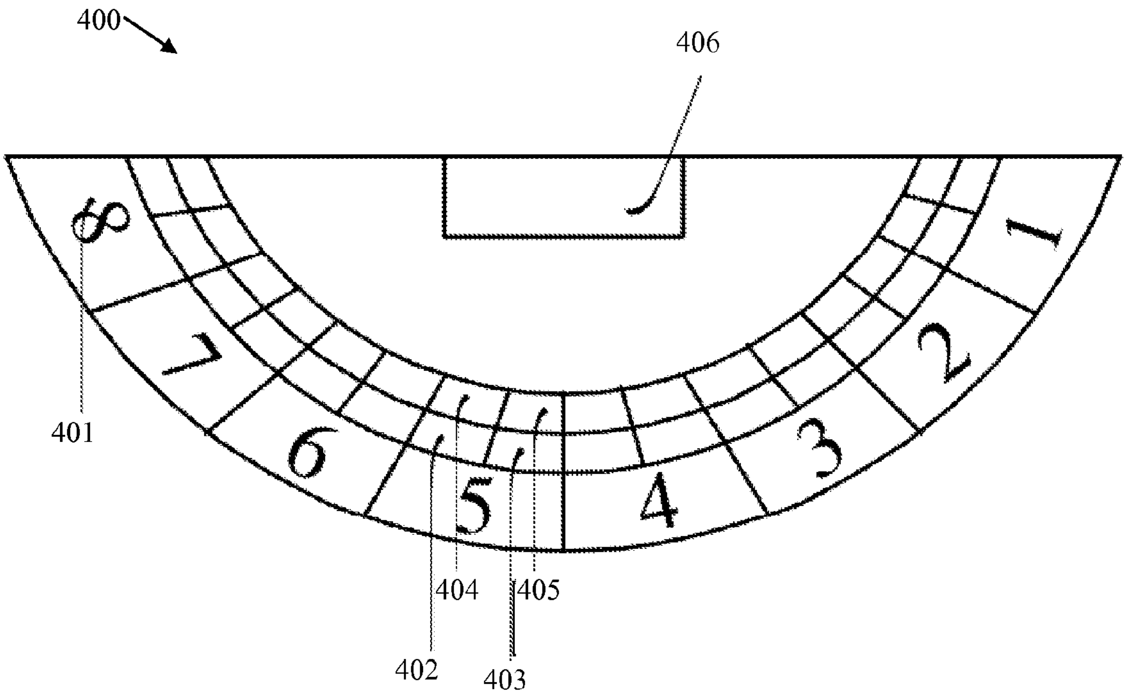
FIG. 4 shows an illustrative representation of a casino card game table arranged for playing the game according to the method from FIGS. 3*a-b*.

FIG. 4 shows an illustrative representation of a casino card game table 400 arranged for playing the game according to the method from FIGS. 3*a-b*. The four betting areas corresponding to the four bets available under the FIGS. 3*a-b* method, are the 9-bonus bet area 404, the player line bet area 402, the banker Monkey-9 bet area 405 and the tie line bet area 403. As described earlier when referring to table from FIG. 2, this table also may have a dealer's tray 406 and eight player sections 401.

Figure 5A:
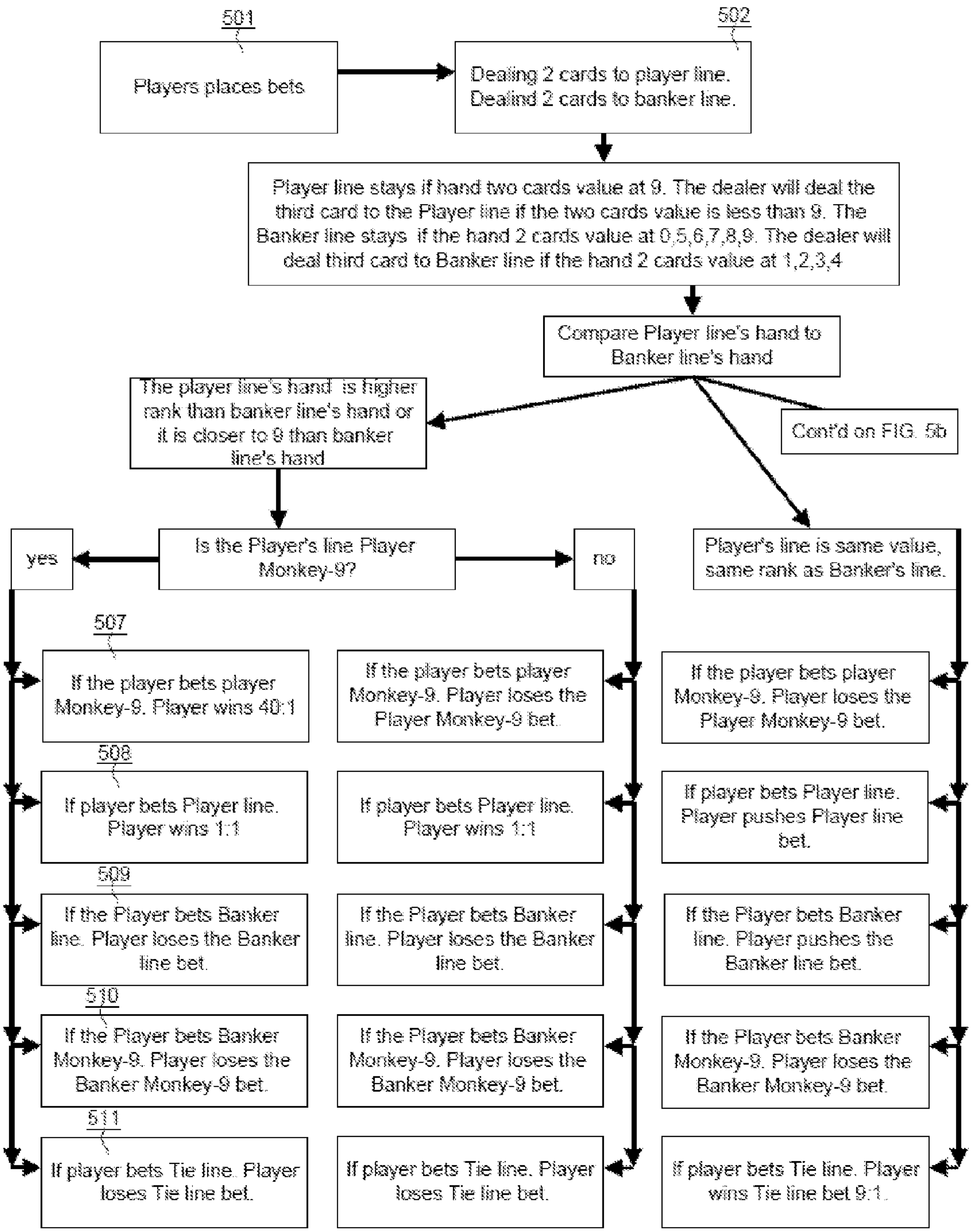
FIGS. 5*a-b* is an illustrative flowchart of yet another method of playing a casino card game according to an embodiment.
Figure 5B:
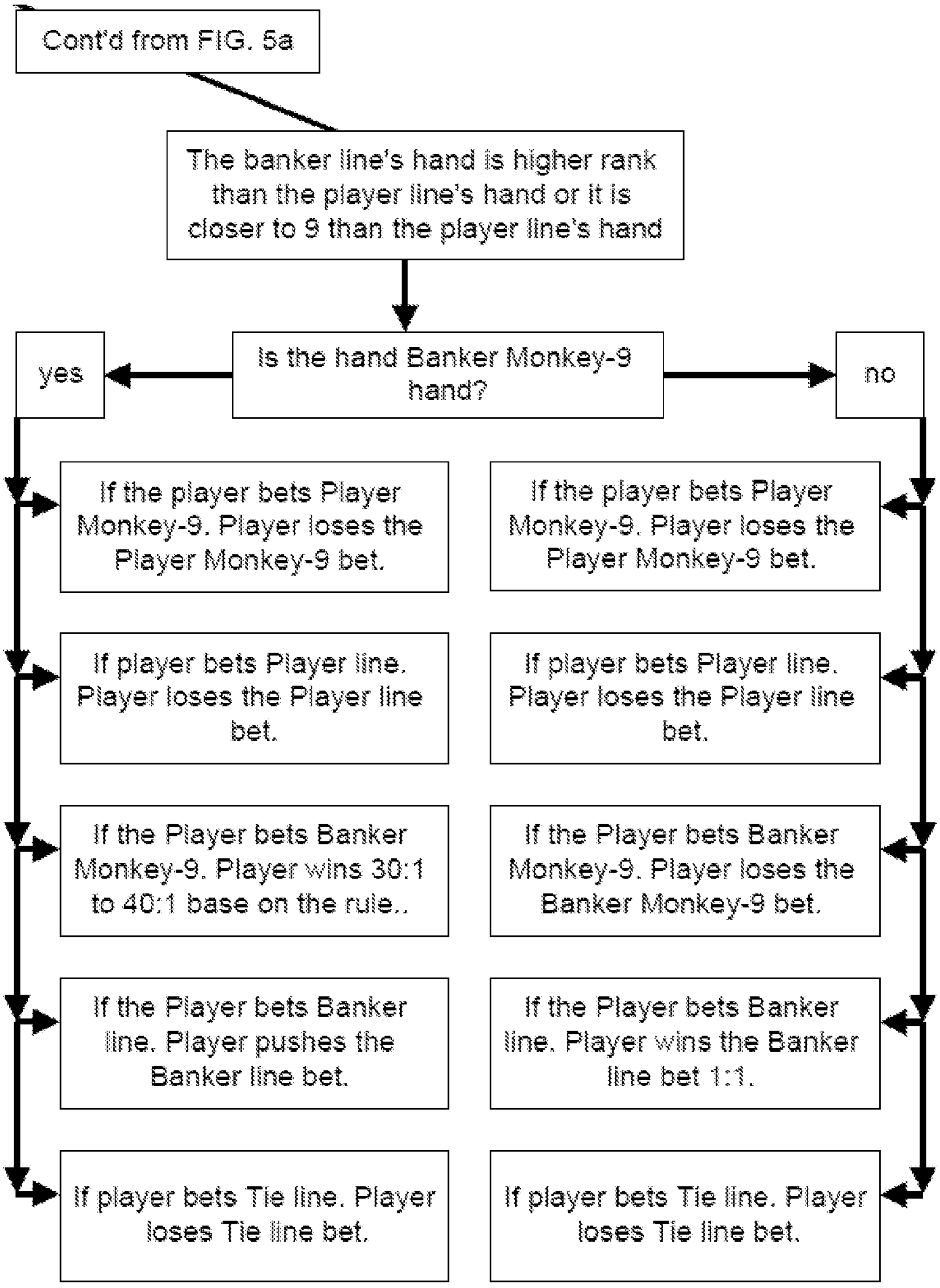

FIGS. 5*a-b* is an illustrative flowchart of yet another method of playing a casino card game according to another embodiment. It should be noted that there two major differences between the methods described above in reference to FIGS. 1*a-b*, 2*a-b*, and this alternative method. First, it should be noted that after the players place their bets (step 501), the cards are dealt (step 502) only to the player line cards area 609 (FIG. 6) and banker line cards area 608 (FIG. 2), unlike in the FIGS. 1*a-b* and 2*a-b* methods, where all players receive and play their own cards. The second difference is that, the 9-bonus bet from FIG. 1*a-b* method is replaced with the player Monkey-9 bonus bet (507 in FIG. 5*a*), which may be won and paid according to the rules earlier described as pertaining to the player Monkey-9 bet. Again, the player Monkey-9 bet may be paid preferably at 40-42:1, depending in part of the profit rate desired. Thus, the five bets/wagers (and thus, possible associated outcomes), available under the method illustrated in FIGS. 5*a-b* are the player Monkey-9 bet (see for example step 507), the player line bet (step 508), the banker line bet (step 509), the banker Monkey-9 bet (step 510) and the tie line bet (step 511). All the other details in terms of steps and the applicable rules (i.e., draw rules, win rules, payout rules, etc) are substantially the same as stated earlier in connection to FIGS. 1*a-b* method and as illustrated in the flow charts of FIG. 5*a* and FIG. 5*b*.

Figure 6:
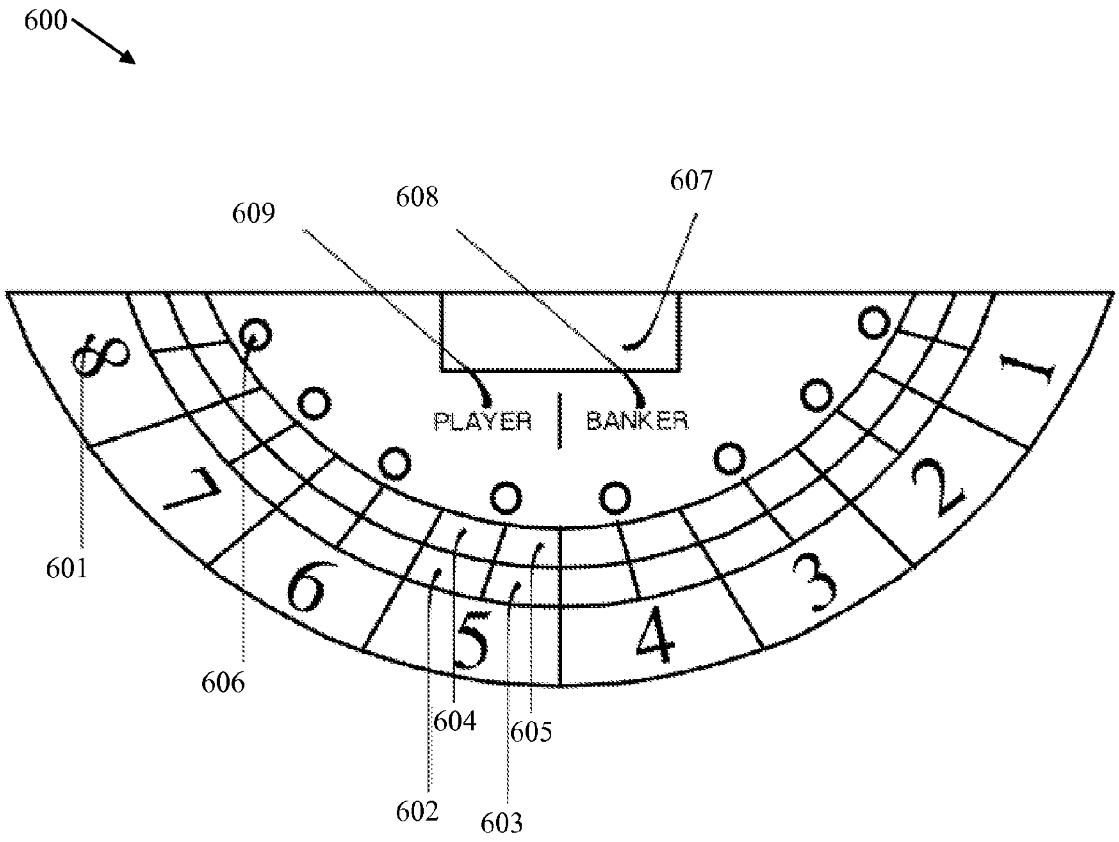
FIG. 6 shows an illustrative representation of a casino card game table arranged for playing the game according to the method from FIGS. 5*a-b*.
Figure 7A:
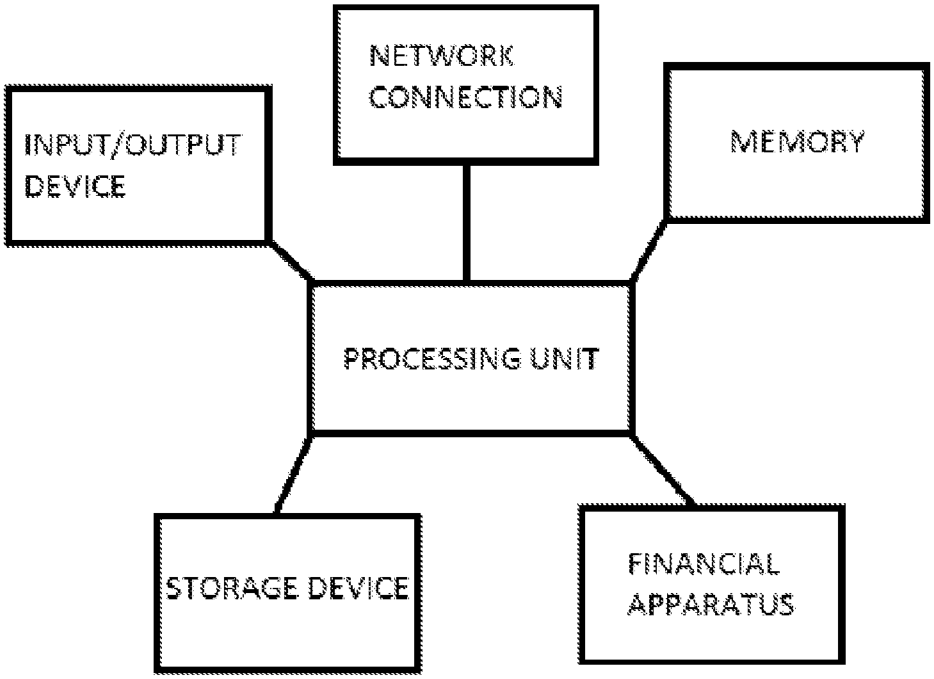
FIGS. 7*a-b* depict exemplary structures for electronic gaming machines.
Figure 7B:
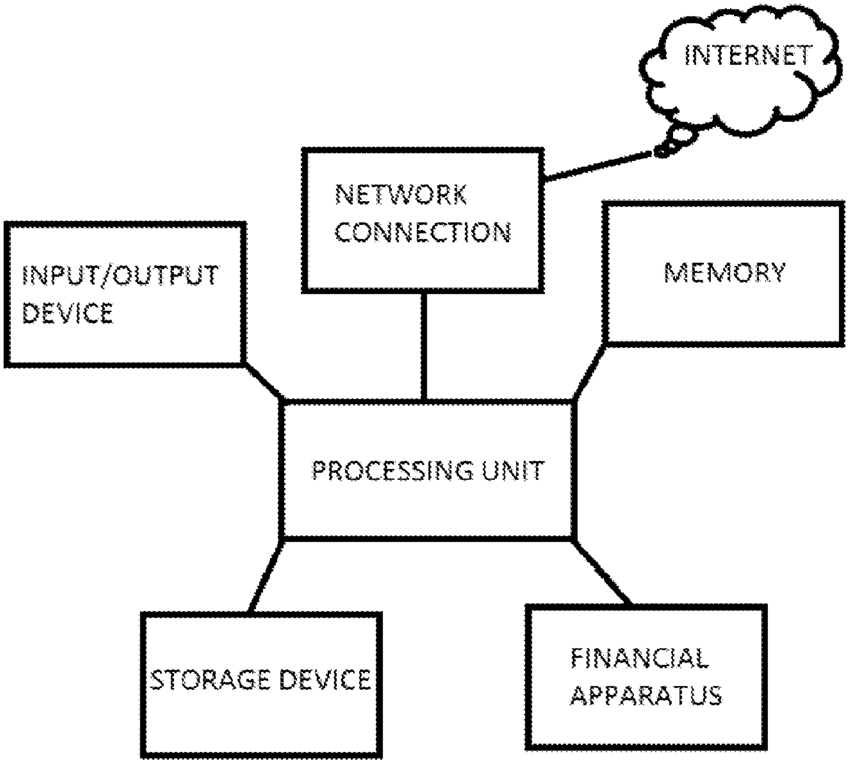

FIG. 6 shows an illustrative representation of a casino card game table 600 arranged for playing the game according to the method from FIGS. 5*a-b*. The five betting areas corresponding to the five bets/wagers available under the FIGS. 5*a-b* method as described above, are the Player Monkey-9 bet area 604, the player line bet area 602, the banker line bet area 603, the banker Monkey-9 bet area 605 and the tie line bet area 606. Again, as described earlier when referring to table from FIG. 2, this table also may have a dealer's tray 607 and eight player sections 601.

As stated before, the above three methods of playing the casino games are exemplary only. Furthermore, one of ordinary skills in the art would realize that each of the three methods may be subjected to modifications without departing from the scope of the invention.

It should be understood that, as an alternative, in states or jurisdictions where the dealer is not allowed to represent the house as a bank (house bank) a method of play using a third party banker (e.g., a corporation) to play in the game and act as a banker on behalf of his/her employer may be used. In this situation the opportunity to bank the game may be offered to all players. A button or similar apparatus may rotate around the table position to position (to indicate whose turn is to bank the game), with each individual player agreeing or disagreeing on acting as the player-banker. When a player-banker banks the game, it is customary for the third party banker she represents to cover all action in excess of the amount risked by the player-banker. This allows full action at all times to the participants.

As another alternative, where/when there is no third party banker available, the opportunity to bank the game may be rotated around the table as above and those players wishing to bank will have the chance to risk their money against the wagers of the other players.

As another alternative, the player wager can be paid bonus at a rate of 6:5 or 3:2 when the hand is 0-9 (i.e., two cards of a 0 and a 9). The player wager will then be a push when the player Monkey-9 bonus occurs.

As another alternative, the player's Monkey-9 bonus win can occur when player has a value of nine in her hand of three cards, and banker's hand has alternate value of 5, 6, 7 or 6, 7, 8 or 4, 5, 6, 7 or any combination of the three or four value.

As another alternative, the banker Monkey-9 bet may win when there is a value of 8 in banker's hand and player's hand value is less than 8.

As another alternative, the banker's hand draws a third card when the hand is valued at zero through 3 or 2 through 5 or 0, 1, 3, 5 or any combination of three or four value that is less than five.

As another alternative, the banker line may win 1:1 when the banker Monkey-9 occurs and the banker line may lose when the banker's three-card hand is value at 2.

It should be understood that the game described herein may be played live (in person) or in electronic format such over the internet.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives.

With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

Although the present invention has been described above in detail, it is not limited to the specific embodiments described herein. Various modifications and additions may be made and will be apparent to those skilled in the art. For example, the present invention could be easily adapted for electronic play or as a home board game in the same manner that some popular games have been adapted in the past. Accordingly, the invention should not be limited to the foregoing description but rather should be defined only by the following claims.

What is claimed is:

1. A method of playing a card game on electronic gaming machine, the electronic gaming machine comprising a display, an interface, and a processor, in which at least one player plays her own hand against a banker's hand, using at least one deck of conventional playing cards, wherein Kings, Queens, Jacks, and tens have a value of zero, Aces have a value of one, and all other cards have a value equal to their numeric face value, wherein, when the total value of the cards in a hand equals ten or more, only the right-hand digit is considered, and wherein the rank of the hands, from highest to lowest rank, starts with a Natural 9 hand, which is a two-card hand having a value of nine, followed by a three-card hand having a value of nine, and continues with an eight-through-zero hand, which is a two or three card hand that has a value of eight, seven, six, five, four, three, two, one or zero, the method comprising: each player placing at least one of a plurality of bets available according to pre-determined betting rules; dealing two cards to each player and two cards to the banker; dealing a third card to each player if the total point value of her two cards is less than nine, and dealing a third card to the banker if the total point value of the banker's two cards is a pre-determined value; comparing each player's hand with the banker's hand; determining each player's win or loss based on the total point value and the rank of each player's hand and according to pre-determined win rules of each of the plurality of bets on which the player has placed a bet; and, settling the bets by rewarding winning bets from each player according to pre-determined payout rules, collecting bets from each losing player, and returning bets to each player entitled to a push according to the pre-determined payout rules.

2. The method of claim 1, wherein the plurality of bets comprises a 9-Bonus bet, a Player bet, a Banker bet, a Banker Monkey-9 bet and a Tie bet and wherein all cards are dealt face down or all cards are dealt face up.

3. The method of claim 2, wherein, according to the pre-determined betting rules, each player may place the Tie bet even if the player has not also placed either the Player bet or the Banker bet, and wherein, each player may only place the Banker Monkey-9 bonus bet if the player has also placed either the Player bet, the Banker bet or both.

4. The method of claim 2, wherein the pre-determined value of the total point value of the banker's two cards comprises the value of one, two, three and four.

5. The method of claim 2, wherein, according to the pre-determined win rules and the pre-determined payout rules, if a player's hand is nine and the banker's hand is less than nine, then, if previously placed, the player wins and receives a payout for the 9-Bonus bet according to a pre-determined payout table, wins and receives a payout of 1:1 for the Player bet, and the player loses the Banker bet, the Banker Monkey-9 bet and the Tie bet.

6. The method of claim 5, wherein the pre-determined payout table comprises a payout of 200:1 for a three-card hand, wherein each card has the same value of three, and a payout of 40:1 for a three-card hand, wherein one card has a value of two, another card has a value of three and another card has a value of four.

7. The method of claim 2, wherein, according to the pre-determined win rules and the pre-determined payout rules, if a player's hand is nine and the banker's hand is also nine, but the player's hand has higher rank, then, if previously placed, the player wins and receives a payout for the 9-Bonus bet according to a pre-determined payout table, wins and receives a payout of 1:1 for the Player bet, and the player loses the Banker bet, the Banker Monkey-9 bet and the Tie bet.

8. The method of claim 2, wherein, according to the pre-determined win rules and the pre-determined payout rules, if a player's hand is not nine but is closer to nine than the banker's hand, then, if previously placed, the player wins and receives a payout of 1:1 for the Player bet, and the player loses the 9-Bonus bet, the Banker bet, the Banker Monkey-9 bet and the Tie bet.

9. The method of claim 2, wherein, according to the pre-determined win rules and the pre-determined payout rules, if a player's hand has the same value and rank as the banker's hand, then, if previously placed, the player wins or loses the 9-Bonus bet according to a pre-determined payout table, pushes the Player bet and the Banker bet, and the player loses the Banker Monkey-9 bet and wins the Tie bet.

10. The method of claim 9, wherein the Tie bet win receives a payout of 9:1.

11. The method of claim 2, wherein, according to the pre-determined win rules and the pre-determined payout rules, if a banker's hand is higher in rank or its value is closer to nine than the player's hand and banker's hand is also a Banker Monkey-9 hand, wherein a Banker Monkey-9 hand is a hand where the banker's first two cards point value is four and the third card point value is five, then, if previously placed, the player loses the 9-Bonus bet, the Player bet and the Tie bet, pushes the Banker bet, and the player wins the Banker Monkey-9 bet receiving a payout of 30:1.

12. The method of claim 2, wherein, according to the pre-determined win rules and the pre-determined payout rules, if a banker's hand is higher in rank or its value is closer to nine than the player's hand and banker's hand is not also a Banker Monkey-9 hand, then, if previously placed, the player wins or loses the 9-Bonus bet according to a pre-determined payout table, the player loses the Player bet, the Banker Monkey-9 and the Tie bet, and wins the Banker bet receiving a payout of 1:1.

13. A method of playing a card game on electronic gaming machine, the electronic gaming machine comprising a display, an interface, and a processor, in which at least one player plays her own hand against a banker's hand, using at least one deck of conventional playing cards, wherein Kings, Queens, Jacks, and tens have a value of zero, Aces have a value of one, and all other cards have a value equal to their numeric face value, wherein, when the total value of the cards in a hand equals ten or more, only the right-hand digit is considered, and wherein the rank of the hands, from highest to lowest rank, starts with a Natural 9 hand, which is a two-card hand having a value of nine, followed by a three-card hand having a value of nine, and continues with an eight-through-zero hand, which is a two or three card hand that has a value of eight, seven, six, five, four, three, two, one or zero, the method comprising: each player placing at least one of a plurality of bets available according to pre-determined betting rules; dealing two cards to each player and two cards to the banker, wherein one of the two cards of the banker is face down; each player optionally surrendering her two cards in exchange of a partial loss; dealing a third card to each player who did not surrender if the total point value of her two cards is less than nine, and dealing a third card to the banker if the total point value of the banker's two cards is a pre-determined value; comparing each player's hand with the banker's hand; determining each player's win or loss based on the total point value and the rank of each player's hand and according to pre-determined win rules of each of the plurality of bets on which the player has placed a bet; and, settling the bets by rewarding winning bets from each player according to pre-determined payout rules, collecting bets from each losing player, and returning bets to each player entitled to a push according to the pre-determined payout rules.

14. The method of claim 13, wherein the plurality of bets comprises a 9-Bonus bet, a Player bet, a Banker Monkey-9 bet and a Tie bet.

15. The method of claim 14, wherein each surrendering player loses half of the Player bet and entirely the 9-Bonus bet and the Banker Monkey-9 bet.

16. A method of playing a card game on electronic gaming machine, the electronic gaming machine comprising a display, an interface, and a processor, in which at least one player makes a bet that either a Bank hand or a Player hand will win, using at least one deck of conventional playing cards, wherein Kings, Queens, Jacks, and tens have a value of zero, Aces have a value of one, and all other cards have a value equal to their numeric face value, wherein, when the total value of the cards in a hand equals ten or more, only the right-hand digit is considered, and wherein the rank of the hands, from highest to lowest rank, starts with a Natural 9 hand, which is a two-card hand having a value of nine, followed by a three-card hand having a value of nine, and continues with an eight-through-zero hand, which is a two or three card hand that has a value of eight, seven, six, five, four, three, two, one or zero, the method comprising: each player placing at least one of a plurality of bets available according to pre-determined betting rules; dealing two cards to Player hand and two cards to the Banker hand; dealing a third card to Player hand if the total point value of the Player hand first two cards is less than nine, and dealing a third card to the Banker hand if the total point value of Banker hand first two cards is a pre-determined value; comparing Player hand with the Banker hand; determining each player's win or loss based on the total point value and the rank of Player hand and Banker hand, and according to pre-determined win rules of each of the plurality of bets on which the player has placed a bet; and, settling the bets by rewarding winning bets from each player according to pre-determined payout rules, collecting bets from each losing player, and returning bets to each player entitled to a push according to the pre-determined payout rules.

17. The method of claim 16, wherein the plurality of bets comprises a Player Monkey-9 bet, a Player bet, a Banker bet, a Banker Monkey-9 bet and a Tie bet.

18. The method of claim 17, wherein the Player Monkey-9 bet is won when the Player hand has a value of nine using three cards and the Banker final hand has a value of 1, 2, 3, 4 or 5, regardless of the number of cards.

* * * * *